United States Patent
Major et al.

(10) Patent No.: US 11,348,325 B2
(45) Date of Patent: May 31, 2022

(54) GENERATING PHOTOREALISTIC VIEWABLE IMAGES USING AUGMENTED REALITY TECHNIQUES

(71) Applicant: CDS Visual, Inc., San Jose, CA (US)

(72) Inventors: John Cameron Major, San Jose, CA (US); Aaron Martin Smith, San Jose, CA (US)

(73) Assignee: CDS VISUAL, INC., San Jose, CA (US)

( * ) Notice: Subject to any disclaimer, the term of this patent is extended or adjusted under 35 U.S.C. 154(b) by 0 days.

(21) Appl. No.: 17/157,789

(22) Filed: Jan. 25, 2021

(65) Prior Publication Data

US 2021/0350634 A1    Nov. 11, 2021

Related U.S. Application Data

(60) Provisional application No. 63/021,043, filed on May 6, 2020.

(51) Int. Cl.
  *G06T 19/20* (2011.01)
  *G06T 19/00* (2011.01)
  *G06T 17/00* (2006.01)

(52) U.S. Cl.
  CPC .............. *G06T 19/20* (2013.01); *G06T 17/00* (2013.01); *G06T 19/006* (2013.01); *G06T 2200/24* (2013.01); *G06T 2219/2016* (2013.01)

(58) Field of Classification Search
  None
  See application file for complete search history.

(56) References Cited

U.S. PATENT DOCUMENTS

| | | | |
|---|---|---|---|
| 10,235,810 B2 | 3/2019 | Morrison | |
| 10,284,794 B1* | 5/2019 | Francois | .................. G06K 9/46 |
| 10,497,053 B2 | 12/2019 | Morrison | |
| 2011/0244919 A1 | 10/2011 | Aller et al. | |
| 2014/0267404 A1* | 9/2014 | Mitchell | ............... G06T 19/006 |
| | | | 345/633 |

(Continued)

OTHER PUBLICATIONS

3D & 360 Product Photography Equipment, Snap36, Available Online at: https://snap36.com/solutions/product-photography-equipment/, Accessed from Internet on Apr. 21, 2021, 5 pages.

(Continued)

*Primary Examiner* — Robert J Craddock
(74) *Attorney, Agent, or Firm* — Kilpatrick Towusend & Stockton LLP (57) ABSTRACT

Methods, systems, computer-readable media, and apparatuses are presented for generating a photorealistic viewable model using augmented reality (AR). An AR scene is generated by overlaying a virtual object onto a view of a physical environment. When placed into the AR scene, the virtual object can interact with the physical environment by, for example, reflecting or taking on colors, shadows, brightness, and other attributes of the physical environment. To generate the viewable model, the virtual object is manipulated (e.g., moved or rotated) within the AR scene and a plurality of images are generated by capturing the virtual object as the virtual object is being manipulated. The viewable model can be generated based on one or more of the images and can be output in the form of an interactive presentation, for example, a spin image.

20 Claims, 5 Drawing Sheets

(56) References Cited

U.S. PATENT DOCUMENTS

| | | | | |
|---|---|---|---|---|
| 2017/0323488 A1* | 11/2017 | Mott | ................... | G06T 19/006 |
| 2018/0041734 A1 | 2/2018 | Hanai et al. | | |
| 2018/0255290 A1 | 9/2018 | Holzer et al. | | |
| 2019/0228582 A1 | 7/2019 | Yerkes et al. | | |
| 2020/0258312 A1* | 8/2020 | Shin | ................... | G06T 19/006 |

OTHER PUBLICATIONS

3D Web Viewer, Augmentes, Available Online at: https://augmentes.com/3d-web-viewer-2/, Accessed from Internet on Apr. 21, 2021, 2 pages.

Create Interactive 360 Product Photography & 3D CGI, Webrotate360, Available Online at: https://www.webrotate360.com/, Accessed from Internet on Apr. 21, 2021, 12 pages.

How to Create and Embed 3D Images, Cappasity, Available Online at: https://cappasity.com/3d-product-imaging/, Accessed from Internet on Apr. 21, 2021, 10 pages.

Photoshop Mockups for Product Presentation, PSD Covers, Available Online at: https://www.psdcovers.com/, Accessed from Internet on Apr. 21, 2021, 8 pages.

Brumby, "Best Number of Images for a 360 Spin", Sirv, Available Online at: https://sirv.com/blog/images-for-a-360-spin/, Apr. 21, 2017, 6 pages.

Dawson, "ARKit by Example—Part 4: Realism—Lighting & PBR", Available Online at: https://blog.markdaws.net/arkit-by-example-part-4-realism-lighting-pbr-b9a0bedb013e?gi=249297d94545, Jun. 18, 2017, 11 pages.

Houston, "3D and AR have Hit Ecommerce. Are you ready?", Digital Commerce, Available Online at: https://www.digitalcommerce360.com/2019/06/25/3d-and-ar-have-hit-ecommerceare-you-ready/, Jun. 25, 2019, 11 pages.

Houston, "Virtual Photography: The Future of eCommerce Product Images", ThreeKit, Available Online at: https://www.threekit.com/blog/4-ways-that-virtual-product-photography-will-improve-your-ecommerce-strategy, Dec. 16, 2020, 17 pages.

Soulier et al., "Estimating Illumination Direction for Augmented Reality in Real-Time by using Low-Cost Sensors", Journal of Computer Science & Technology, vol. 17, No. 2, Available Online at: https://www.researchgate.net/publication/323935998_Estimating_Illumination_Direction_for_Augmented_Reality_in_Real-Time_by_using_Low-Cost_Sensors, Oct. 2017, pp. 149-153.

International Patent Application No. PCT/US2021/030955, International Search Report and Written Opinion dated Aug. 12, 2021, 11 pages.

* cited by examiner

GENERATING PHOTOREALISTIC VIEWABLE IMAGES USING AUGMENTED REALITY TECHNIQUES

CROSS-REFERENCED TO RELATED APPLICATIONS

This application claims the benefit of U.S. Provisional Application No. 63/021,043 filed on May 6, 2020, which is incorporated herein by reference in its entirety.

BACKGROUND

A "spin image" includes a string of photorealistic images (jpegs, pngs, etc.,) strung together in a user-controlled animation that allows for the 360° rotation around a view of an object. Analogous to the classic animation booklets where an image appears to move as the pages are flipped in front of the user, spin images may provide a feeling of rotational animation as the individual images are sequentially displayed. Spin images are becoming common additions to the e-commerce shopping experience. In particular, online shopping sites encourage sellers to provide spin images so prospective buyers can view the item from all sides and multiple angles. Adding spin images has been shown to increase sales by between 15% to 70%. Effective spin images create the feeling of animation, and thus may need a new image at least every 10° of rotation. For example, some implementations may use a collection of 72 images taken at 5° incremental steps of rotation for a smooth feel when viewing the spin images. However, generating this large number of images of an actual object at controlled rotation angles can be very time-consuming and difficult to achieve.

BRIEF SUMMARY

According to techniques disclosed herein, a viewable model is created based on capturing one or more images of a virtual object (also referred to herein as an augmented reality (AR) object) within an AR scene. The virtual object augments a view of a real-world (physical) environment and is generated within the AR scene based on an AR model. Once placed into the AR scene, the virtual object can be manipulated in various ways so that images of the virtual object in different states, such as different positions and/or configurations, can be captured. The one or more captured images are then processed to form a viewable model.

In certain embodiments, a viewable model can be viewed in a user interactive manner. For instance, the viewable model may be output in the form of a spin image. Spin images are rapidly becoming a common feature of ecommerce shopping. Numerous ecommerce sellers now have web sites in which a prospective buyer can browse purchasable objects from a catalog and interactively view a purchasable object through a spin image. Spin images can show an object moving, based on a sequence of images of the object in different positions. This is similar to a flip book in which motion of an object is simulated by rapidly flipping through the pages of the flip book. A spin image enables a prospective buyer to view the purchasable object from multiple sides and angles. Often, the spin image is capable of showing the object through a full 360 degree rotation. A user can rotate a spin image by, for example, clicking and dragging on the displayed object, dragging a slider bar, or dragging their finger across a touchscreen. Spin images provide a greater degree of detail about an object compared to non-interactive images (e.g., static images) or less interactive images (e.g., zoomable photos). Unlike conventional methods of generating spin images, such as turntable photography or computer-generated imagery (CGI), the AR techniques described herein enable photorealistic spin images to be generated in a more cost-effective, convenient, and faster manner.

In certain embodiments, an AR model includes a set of parameters corresponding to different attributes of a virtual object (materials, colors, textures, etc.). The object attributes may be configurable to enable the appearance of the virtual object to be changed such that a single AR model supports different configurations (e.g., size, color, accessories, etc.). When a viewable model generated based on captured images of a virtual object in an AR scene is output on a display, the virtual object looks real due to the use of the object attributes, which interact with the attributes of the physical environment within the AR scene (e.g., the colors, shading, and lighting in a room). For example, the virtual object may show reflections from the physical environment.

The embodiments described herein are not limited to spin images. Instead, a viewable model generated according to the AR techniques described herein can be output as any form of animation or as a still image. For example, a viewable model may show a virtual object moving from one location in a physical environment to another location in the physical environment. As another example, a viewable model may show a virtual object changing colors. Any change in the configuration or state of a virtual object can be captured for use in generating a viewable model. As yet another example, different parts of a virtual object can be manipulated to show how the parts operate or interact with each other. For instance, a viewable model may show a virtual object transitioning between an assembled state and a disassembled state (e.g., an exploded view).

Because viewable models are generated from images of virtual objects, the portions of a viewable model which correspond to a physical environment can readily be removed through computer processing, e.g., so that the viewable model shows a virtual object against a blank background. The viewable model will, however, retain the appearance of the virtual object as it appears within an AR scene, e.g., under the specific lighting conditions and colors present at the time the virtual object was captured. Additionally, because viewable models are generated without requiring a physical object to be present, viewable models can be generated using any physical environment. This includes physical environments where a turntable would be difficult to set up, such as on top of a mountain, over a body of water, in inclement weather, and the like. Viewable models can therefore be created using physical environments that better showcase virtual objects. For instance, a viewable model could show a pair of virtual skis at an actual ski resort, virtual hiking shoes on an actual hiking trail, a virtual boat on an actual lake, a virtual refrigerator in an actual kitchen, and so on. Further, a physical environment is not limited to a natural setting, but can include, for example, a life-sized or miniature diorama.

In certain embodiments, a method for generating a viewable model involves receiving, by a computer system, a view of a physical environment, where the view is captured using a camera located in the physical environment. The method further involves generating, by the computer system, an AR scene by overlaying a virtual object onto the view of the physical environment, and generating, by the computer system, a plurality of images using the AR scene. The generating of the plurality of images includes manipulating the virtual object within the AR scene and capturing the virtual object being manipulated within the AR scene. The method further involves generating, by the computer system, a viewable model based on at least one image of the plurality of images, and outputting, by the computer system, the viewable model on a display.

DETAILED DESCRIPTION

In the following description, for the purposes of explanation, specific details are set forth in order to provide a thorough understanding of the disclosed embodiments. However, it will be apparent that various embodiments may be practiced without these specific details.

Figure 1:
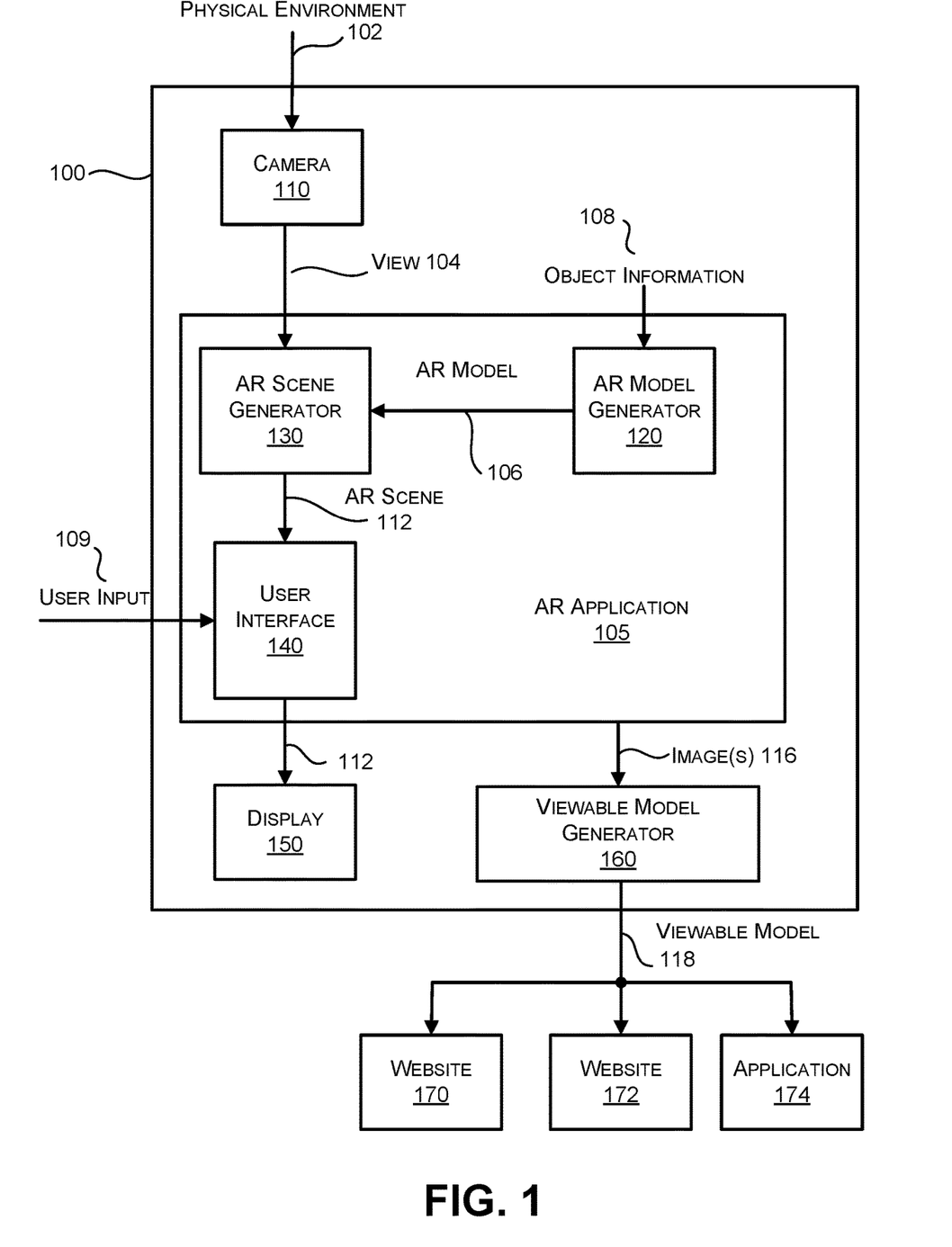
FIG. 1 is a block diagram of a system for generating a viewable model, according to certain embodiments.

FIG. 1 illustrates a block diagram of a system 100 for generating a viewable model 118, according to certain embodiments. The system 100 may include a camera 110, an AR object generator 120, an AR scene generator 130, a user interface 140, a display 150, and a viewable model generator 160. The system 100 may include a handheld computing device, such as a tablet computer, a smart phone, and/or the like.

Camera 110 may be configured to capture a view 104 of a physical environment 102. For instance, the camera 110 may be configured to generate a live video stream of the physical environment 102. In certain embodiments, the camera 110 may be located on a computing device that also performs processing to generate the viewable model 118, e.g., the processing described below with respect to the viewable model generator 160. However, the camera 110 need not be on the same device as the viewable model generator 160.

Further, as shown in FIG. 1, the AR object generator 120, the AR scene generator 130, and the user interface 140 can be part of an AR application 105. In some embodiments, the viewable model generator 160 may also be part of the AR application 105. Thus, the components of the system 100 may be implemented on a single computing device or distributed across multiple computing devices. As an example, the camera 110 could be located on a mobile device (e.g., a smartphone mounted on a tripod) that transmits the view 104 in a live video stream to a first remote computing device executing the AR application 105, and a second remote computing device could execute the viewable model generator 160. As another example, the AR application 105 and the viewable model generator 160 may both be executed on a mobile device that includes the camera 110 and the display 150.

Physical environment 102 may include any real-world environment. In some scenarios, the physical environment 102 include a physical model, such as a miniature model of a mountain. In another example, the physical environment may include an outdoor environment, such as a natural setting in the mountains or an urban environment. Thus, the physical environment 102 may include natural and/or artificial environments. The physical environment 102 may include one or more physical light sources such as natural light (e.g., sunlight) and/or artificial lights (e.g., indoor lighting). The physical environment 102 may also include one or more physical objects such as buildings, man-made objects, people, animals, plants, bodies of water, and/or any other object that may be captured by the camera 110. The camera 110 may update the view 104 to reflect changes in the physical environment 102 over time. For example, a live video stream generated by the camera 110 may show changes in the lighting conditions of the physical environment 102, movement of physical objects within the physical environment 102, and/or other live changes as they occur in the physical environment 102.

AR object generator 120 may be configured to generate an AR model 106 based on object information 108. The AR model 106 may include a computer representation of a virtual object. The object information 108 may include information associated with a real-world counterpart to the virtual object. Examples of object information 108 include computer-aided design (CAD) files and attribute information (e.g., reflectivity values, texture or color swatches, and so on). In some instances, separate computer files may be provided for different parts of the virtual object. For instance, the virtual object represented by the AR model 106 may come in different configurations (e.g., accessories such as different vehicle tires, different sizes, or different choices of materials). Thus, the object information 108 may include configuration information that, when incorporated into the AR model 106, indicates how a virtual object can be visually reconfigured or modified.

AR scene generator 130 may receive the view 104 captured by the camera 110. The AR scene generator 130 may also receive the AR model 106 and may be configured to augment the view 104 with the virtual object represented by the AR model 106. Specifically, the AR scene generator is configured to generate an AR scene 112 by creating the virtual object based on the information in the AR model 106 and then overlay or composite the virtual object onto the view 104 of the physical environment 102. The AR scene 112 may include a three-dimensional (3D) scene in which the virtual object (which may also be also 3D), is placed in a particular position and with a particular orientation. When the virtual object is placed into the AR scene 112, the virtual object may take on the properties of the physical environment 102. For example, the surfaces of the virtual object may be illuminated by light sources in the physical environment 102 and/or generate reflections of colors in the physical environment 102.

Figure 2:
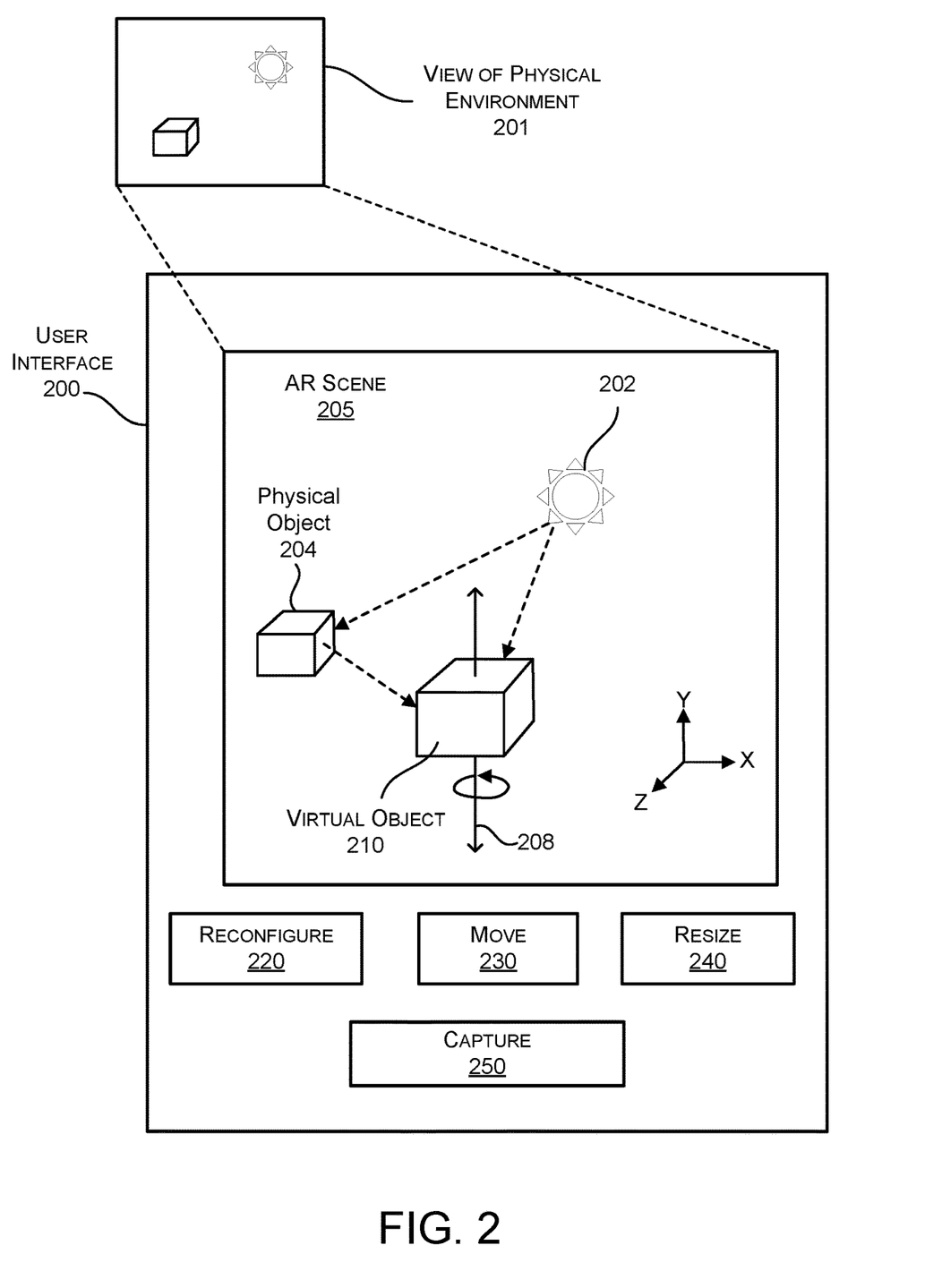
FIG. 2 illustrates an example user interface for capturing images of a virtual object, according to certain embodiments.

The user interface 140 may be configured to receive user input 109 in connection with the capturing of one or more images 116 of the virtual object within the AR scene 112. An example of a user interface suitable for implementing the user interface 140 is shown in FIG. 2 described in detail below. The user interface 140 may be caused to be displayed on the display 150 in a real-time view and may permit a user to initiate capture of the images 116 by the AR application 105. In some embodiments, the capture process is automated. For example, the AR application 105 may be configured to automatically rotate (e.g., through a 360-degree rotation) or otherwise manipulate the virtual object within the AR scene 112, and then automatically capture the images 116 to show the virtual object after being manipulated into the different states. Alternatively, in some embodiments, the user can manually control, through the user interface 140, the capturing of one or more images individually or as a group.

Further, in some instances, the user input 109 may include input for changing the configuration of the virtual object (e.g., selecting a different color from a set of colors specified in the AR model 106) and/or input for manipulating the virtual object within the AR scene 112. For example, the user may manipulate the virtual object into a particular state and then initiate, through the user interface 140, capture of one or more images of the virtual object in the particular state. The manipulation and capture can be repeated so that the user manually controls how the virtual object changes across the images 116.

User interface 140 may be configured to present the AR scene 112 on the display 150. For example, the user interface 140 may be updated on the display 150 in real time to reflect a current view of the physical environment 102 as augmented by the virtual object. Presenting the AR scene 112 on the display 150 may be beneficial to the user as it enables the user to see how the virtual object looks within the AR scene 112. It also allows the user to make any desired adjustments to the virtual object prior to capture of the images 116. For example, the user may move the virtual object so that it is positioned at a particular location within the AR scene 112, resize the virtual object to fit the AR scene 112, and so on. However, the AR scene 112 does not need to be displayed in order for the images 116 to be captured. For instance, in some embodiments, the AR application 105 may be configured to automatically manipulate the virtual object within the AR scene 112 and capture the images 116 without displaying the AR scene 112. In other embodiments, however, the AR scene 112 may be displayed to the user in order to facilitate user input for changing the appearance of the virtual object.

FIG. 2 illustrates an example user interface 200 for capturing images of a virtual object, according to certain embodiments. The user interface 200 may represent an implementation of the user interface 140 in FIG. 1. The user interface 200 may be provided by an AR application (e.g., AR application 105) and may be configured to present (e.g., on the display 150) an AR scene 205 that is generated based on a view 201 of a physical environment captured by a camera (e.g., the camera 110). In the example of FIG. 2, the physical environment may include a light source 202 and/or a physical object 204. The AR scene 205 may be generated by augmenting the view 201 to include a virtual object 210.

The user interface 200 may include one or more user-selectable options for manipulating or changing the appearance of the virtual object 210. For instance, as shown in FIG. 2, the user interface 200 may include an option 220 to reconfigure the virtual object 210, an option 230 to move the virtual object 210, an option to resize the virtual object 210 and/or any other option for altering an appearance or location of the virtual object 210.

Option 220 may, when selected, permit the user to reconfigure the virtual object 210 prior to capturing images of the virtual object 210. For example, the user may customize the appearance of the virtual object relative to a default configuration by selecting a different color (e.g., different paint finishes), a different material (e.g., metal, wood, plastic), or a different texture (e.g., textile patterns) from a submenu. Option 220 may also be used to add or remove accessories or change different parts of the virtual object 210. For example, the AR model on which the virtual object 210 is based may indicate that the virtual object 210 has interchangeable parts, and the option 220 could be used to select which of the interchangeable parts to apply within the AR scene 205. Other configurations may include selecting different sizes for the virtual object 210 (e.g., small, medium, large), adding features to the virtual object 210 (e.g., adding handles, coverings, or other physical devices), and so forth.

Option 230 may, when selected, permit the user to move the virtual object 210, e.g., by changing the location or orientation of the virtual object so that the virtual object is facing a certain direction or placed at particular position within the AR scene 205. For example, to generate a viewable model that may be displayed as a spin image, the user may manually rotate, via option 230, the virtual object 210 about one or more axes of rotation 208. For example, the virtual object 210 may be rotated around a vertical center axis to capture a plurality of images at different rotational increments as part of a 360° rotational set of views of the virtual object 210. The virtual object 210 may also be rotated around other axes, such as a horizontal axis such that the viewable model includes views of the virtual object 210 from nearly any angle. In some embodiments, the user interface 200 may permit the user to select among a set of predefined movements. For example, the AR application may be programmed with or access (e.g., download) a script that specifies how the virtual object 210 should move. Further, the user interface 200 could be configured to allow the user to manually create and store such scripts for use with the same or another virtual object. For example, a script may include a predetermined set of rotations and/or configuration changes as images are captured during rotation. For example, a script may specify rotation around a vertical center axis with images captured every 5°, every 10°, and so forth. The script may then cause the virtual object 210 to be rotated one rotational increment around a horizontal axis, and then the virtual object 210 may be rotated again around the vertical axis. This type of script may generate a 3D, 360° set of views of the virtual object 210 as part of the viewable model.

Other scripts may perform a sequence of movements or animations of the virtual object 210 that extend beyond simple rotations and movements. These scripts may move individual components of the virtual object 210. Examples of movements that can be captured in a set of images to form a viewable model include: opening and closing a door of a virtual vehicle, creating an exploded view showing different parts of a virtual object (e.g., to show how the real object is assembled), manipulating a virtual chair between folded and unfolded states, moving a virtual train along a physical train track or physical model of a train track, and rotating a virtual object about one or more axes of rotation.

Beyond movements, the user interface 200 may be configured to provide an option to add annotations and notes for the AR scene 205. For example, in addition to manipulating a virtual chair between folded and unfolded states, the AR application may enable the user to annotate, via the user interface 200, captured images to add comments or written instructions. These annotations can be incorporated into the resulting viewable model to enable a person viewing the viewable model to, for example, see the chair at any point between the folded and unfolded states, together with instructions on how to fold or unfold the chair. Individual images that are captured as part of the viewable model may include rendered or composited text objects in these images.

Option 240 may, when selected, permit the user to resize the virtual object 210. The user may select between a set of predefined sizes (e.g., small, medium, large) or adjust the size manually, e.g., via a slider bar displayed in response to selecting option 240. As an example, the AR model may indicate a default size for the virtual object 210 that makes the virtual object 210 too large to fit within the AR scene 205 or disproportional to other elements in the AR scene 205. For example, the size of the virtual object 210 may appear too large in relation to the physical object 204. Thus, option 240 may allow the user to reduce or increase the size of the virtual object 210 to a size appropriate for the AR scene 205. The default size for the virtual object 210 may be based on an actual physical size of a physical object upon which the virtual object 210 is modeled. For example, when displaying a virtual object representing a chair, the virtual object may have dimensions that are the same size as the physical chair from which the virtual object is modeled. Option 240 may change the size of the chair to better match the view of the physical environment 201 as captured by the camera.

In certain embodiments, the user interface 200 may include one or more user selectable options that allow the user to change aspects of the AR scene 205 other than the virtual object 210. For example, the user interface 200 may include an option to add or remove a virtual light source, or an option to add or remove additional virtual objects that further augment the view 201 (e.g., by placing the virtual object 210 on a virtual table). Other changes to the AR scene 205 may include visual effects such as fog or mist, other virtual objects that cast shadows upon the virtual object or generate reflections on the virtual object, backgrounds, and so forth.

In addition to options for manipulating the virtual object 210, changing the appearance of the virtual object 210, or options for changing other elements of the AR scene 205, the user interface 200 can include a user selectable option 250 to initiate capture of the virtual object 210. Option 250 may, when selected, initiate capture of one or more images of the virtual object (e.g., the images 116 in FIG. 1). The total number of images captured based on selection of the option 250 may depend on the type of viewable model to be generated. For example, the user interface 200 may be configured to permit the user to specify whether the viewable model being generated will be displayed as a still image (in which case capturing a single image may be sufficient), a spin image, or any other sequence images showing the virtual object 210 being manipulated.

Capturing of images of the virtual object 210 can be performed in an automated or semi-automated fashion. For example, in some embodiments, the AR application providing the user interface 200 may generate a viewable model corresponding to a spin image by automatically rotating the virtual object 210 and capturing the virtual object 210 from different angles without any user input indicating when to begin capture. As another example, the automated rotation and capture may be triggered in response to selection of option 250. Further, in some embodiments, the AR application may permit the user to change some aspect of the virtual object 210 or the AR scene 205 in between captured images. For example, the user may rotate or move the virtual object 210 into a particular position and then initiate capture of a single image by selecting the option 250, then repeat the process by rotating or moving the virtual object 210 into a different position before initiating capture of the next image.

The captured one or more images can show the virtual object 210 interacting with other elements of the AR scene. This includes, for example, physical objects such as the object 204 and real-world light sources such as the light source 202. The interactions can be generated by the AR application based on information from an AR model of the virtual object 210. For example, the AR model may indicate material properties like reflectivity, opacity, and other properties. Based on the information in the AR model, the AR application may generate, for example, reflections of the physical environment off a surface of the virtual object 210. This is illustrated in FIG. 2, where the virtual object 210 is shown receiving direct illumination from the light source 202 and also picking up light from the physical object 204, e.g., so that the virtual object 210 reflects the colors of the physical object 204. As the virtual object 210 moves or the physical environment changes (e.g., the light source 202 gets dimmer or moves to another location) the interactions, and thus the appearance of the virtual object 210, may change correspondingly. The virtual object 210 may pick up the colors, shadows, brightness, etc. of the physical environment so that the captured images appear photorealistic enough that it would be difficult for a person viewing a viewable model generated from such images to determine that the virtual object is not actually a real object that is physically present in the physical environment.

The virtual object 210 may also interact with another virtual object. For example, if the virtual object 210 is placed on a virtual table (not depicted), the virtual object 210 may block the portion of the virtual table on which the virtual object 210 sits from being visible. Further, the virtual object 210 could pick up the colors, shadows, brightness, etc., of the virtual table in a similar manner to how the virtual object 210 interacts with the physical environment. This may further contribute to the realism of the virtual object 210.

Figure 3:
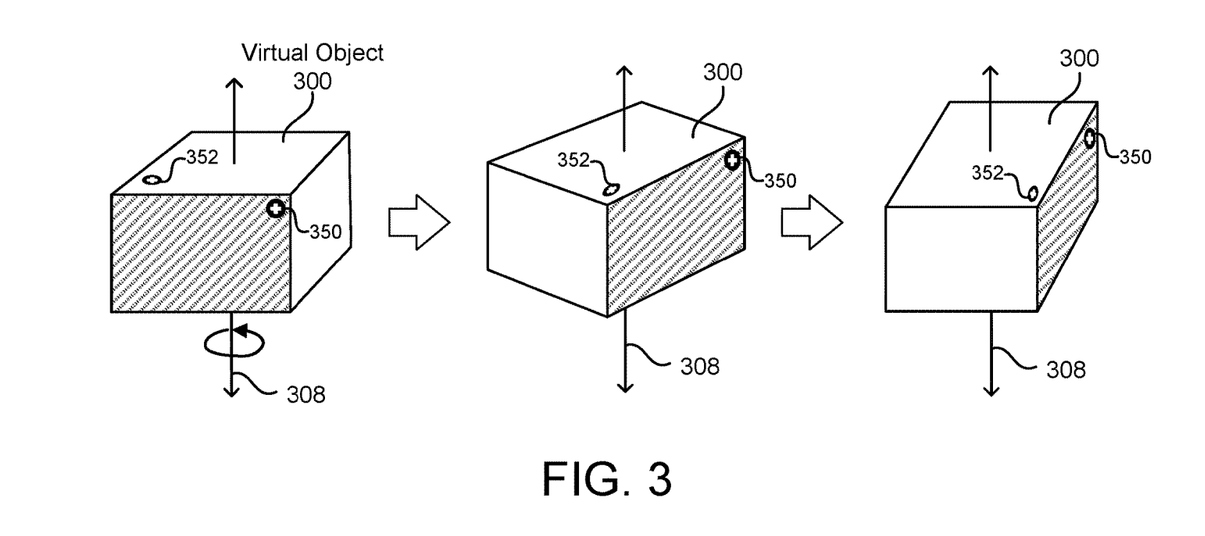
FIG. 3 illustrates an example of a virtual object being manipulated, according to certain embodiments.

FIG. 3 illustrates an example of a virtual object 300 being manipulated, according to certain embodiments. In the example of FIG. 3, the virtual object 300 is rotated about an axis 308. The virtual object 300 can be rotated within an AR scene (e.g., the AR scene 112 in FIG. 1) to capture images of the virtual object 300 rotated into different positions. For instance, to generate the images 116 in FIG. 1, the virtual object 300 may be rotated automatically or manually about the center vertical axis 308, e.g., through a full 360-degree rotation, with images being captured at specific rotational positions.

The total number of images in the images 116 can be user configurable. For example, the user input 109 may directly specify the total number of images or an increment value (e.g., angular separation between each image). Thus, the AR application 105 may capture the images 116 by determining a set of angular positions or angular increments based on the user input 109 and then rotating the virtual object 300 to capture an individual image of the images 116 at each of the determined angular positions. As another example, if the viewable model is to be displayed as an animation, then each captured image may correspond to a particular time point in a time sequence (e.g., a video that is ten seconds long). Images can be captured for specific time points. Alternatively, images can be assigned time points after capture by, for example, specifying a frame rate for the resulting viewable model.

Images 116 captured based on rotating a virtual object in the manner depicted in FIG. 3 can be used to form a viewable model capable of being displayed as a spin image. A typical value from the total number of images in a spin image is 72 images (corresponding to 5-degree steps). Using fewer images provides a less smooth viewing experience when spinning, but may be acceptable in certain circumstances. Conversely, using additional images generally provides a smoother viewing experience. If the spin image for the virtual object 300 is to show the virtual object 300 from more than one plane (e.g., facing the top or bottom surface of the virtual object 300), additional images may be captured through further manipulation of the virtual object 300 within the AR scene.

Some embodiments may allow visual or interactive enhancements to be added to the images 116. For example, some embodiments may include "hotspots" or "sprites" that may act as controls when presented in a 2D interface. FIG. 3 illustrates two hotspots that have been added as part of the virtual object 300. Hotspot 350 may be placed on a front surface of the virtual object 300, while hotspot 352 may be placed on a top surface of the virtual object 300. Other embodiments may include more or fewer hotspots, and these hotspots may be distributed at any locations on the virtual object 300. Therefore, hotspots 350, 352 illustrated in FIG. 3 are provided only by way of example and are not meant to be limiting.

The hotspots 350, 352 may generated and/or placed on the virtual object 300 when textures, colors, material finishes, and so forth, are added to the virtual object 300 when the model is designed, loaded, and/or altered in a virtual environment. For example, the virtual object 300 may be generated and/or altered in a virtual environment, and an interface may allow a user to place hotspots 350, 352 different locations on, for example, surfaces of the virtual object 300. The hotspots 350, 352 may include 3D objects or 2D images or textures that are added to a surface or within a threshold distance of a surface or other feature of the virtual object 300. In the example of FIG. 3, the hotspots 350, 352 include images of a "+" sign inside of a circle, although any other image or texture may be used. This image may be placed on a surface of the virtual object 300 as a 2D image. Other examples may include spheres, cubes, or other 3D objects that may be rendered as part of the virtual object 300.

As the virtual object 300 is rendered as part of the AR scene, the hotspots 350, 352 may be rendered in a similar fashion as part of the virtual object 300. Because the hotspots 350, 352 are connected to or part of the model, they may move with the model as the virtual object 300 is rotated. For example, FIG. 3 illustrates how the virtual object 300 may be rotated around the axis 308. As this rotation occurs, the images of the hotspots 350, 352 may also rotate with the surfaces to which they are connected. This rotation may cause the hotspot images to rotate and become skewed or oblique as the viewing angle changes accordingly. Other embodiments may cause the to the images of the hotspots to always face a virtual camera location. This allows the location of the hotspots to be rotated without changing the viewing perspective or appearance of the hotspots (e.g., the encircled "+" signs may always face the user when viewed in the AR scene).

The hotspots 350, 352 may be associated with functionality such that the user may select the hotspots 350, 352 and perform actions and/or generate additional information to be displayed in the AR scene. For example, when the hotspots 350, 352 are added to the virtual object 300, they may be linked to one or more actions. These actions may include displaying additional information about the location of the virtual object where the corresponding hotspot is located. For example, the action may be executed when a user hovers over or clicks on the rendered image of the hotspot 350 in the AR scene that is displayed on the user device. This may generate a pop-up window that displays additional information about that location on the real-world object represented by the virtual object 300. For example, if the virtual object represents a real-world chair, and the hotspot is placed on the back of the chair, hovering over the image of the hotspot in the AR scene may cause a pop-up window to be generated that displays information about lumbar support and recline features of the chair. In another example, hovering over the hotspot may generate a color palette that allows the user to recolor the virtual object representing the real-world object. In another example, hovering over the hotspot may cause a live chat window to be opened to communicate with a distributor of the real-world object and/or provide purchasing options. Similar actions may include generating an email interface or text messaging interface to send a message regarding the object. Other actions may include opening a dialog box, opening a web browser and navigating to a webpage, downloading or displaying a document, generating images or other views of the object, creating a "div" window, and so forth. Additional actions that manipulate the object itself may include generating controls that alter the shape, color, size, texture, location, lighting, and/or any other visual or physical feature of the virtual object. Some actions may include generating media, including sounds, videos, music, and/or other media presentations or clips that may add to the environment of the AR scene or provide additional information regarding the object.

As images are rendered using the method described above, these images may include a list of coordinates or regions in the 2D images associated with the hotspots 350, 352. For example, one of the 2D images depicting the virtual object 300 may include coordinate locations or regions that include hotspots 350 and 352. These coordinate locations or regions may be stored in a table with corresponding actions. For example, the table may include coordinates or regions for hotspot 350, along with a URL to be displayed in a browser, text to be displayed in a pop-up window, functions to be called in a function library, and/or any other link or description of one or more of the actions described above. When the rendered 2D images 116 are transmitted as part of the viewable model 118, the viewable model 118 may include coordinate locations of the hotspots 350, 352. When a corresponding spin image is displayed for a user, the hotspots 350, 352 may be visible as part of the rendered 2D images that are displayed sequentially as the spin image is rotated. When the user hovers over, clicks on, or otherwise selects a region in the spin image that includes one of the hotspots 350, 352, the server may determine that the user selection falls within the coordinates or region corresponding to that hotspot. The server may then execute the corresponding action associated with that hotspot.

Figure 4:
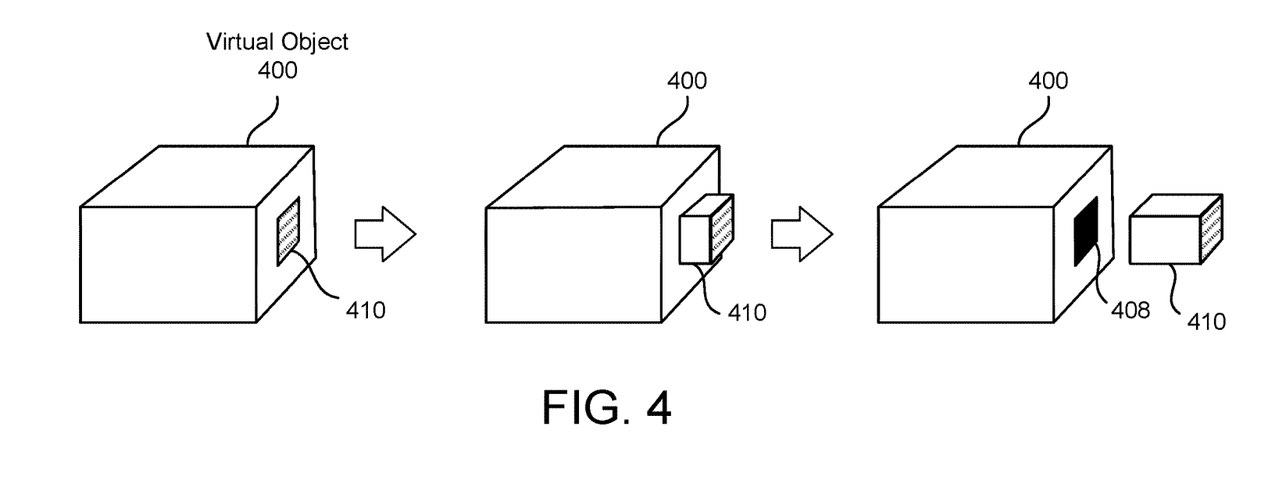
FIG. 4 illustrates an example of a virtual object being manipulated, according to certain embodiments.

FIG. 4 illustrates an example of a virtual object 400 being manipulated, according to certain embodiments. In the example of FIG. 4, the virtual object includes a part 410 that is manipulated to gradually slide out of an opening 408 in the virtual object 400. The movement depicted in FIG. 4 can be captured as a set of images (e.g., the images 116) to form a viewable model that shows the part 410 sliding out of the opening 408. For example, the viewable model may be displayed as an interactive presentation (e.g., an animation controlled in a similar manner to a slide image) or a non-interactive video. FIG. 4 is a simple example. In practice, a virtual object can include numerous parts that can be manipulated in different ways. For instance, a virtual object may include parts that freely rotate, parts that swivel or pivot about a fixed point, parts that interlock, and so on.

In some embodiments, the AR application 105 may capture more images than are needed for the viewable model 118. For example, to generate a spin image, the AR application 105 may rotate the virtual object through a 360-degree rotation to capture an image at every degree of rotation (360 images in total) and then select, based on the user input 109, a subset of the captured images for output to the viewable model generator 160.

Additionally, the images 116 may be captured with or without showing the physical environment 102. For example, the AR application 105 may generate the images 116 by extracting the virtual object 300 from the AR scene 112 so that only the virtual object 300 is shown in the images 116. The viewable model generator 160 may then add a background or show the virtual object 300 against a blank (e.g., white colored, transparent, semi-transparent, etc.) background when forming the viewable model 118. Alternatively, the extraction of the virtual object 300 may be performed after the images 116 are captured, e.g., through image processing performed by the viewable model generator 160. Thus, a single set of images captured from an AR scene may be used to generate both a viewable model showing a physical environment or a viewable model that excludes the physical environment. Further, as indicated above, when a virtual object augments a view of a physical environment, the virtual object can interact with the physical environment in a way that influences the appearance of the virtual object within an AR scene. Such interactions may be preserved even when the virtual object is extracted.

Returning to FIG. 1, the viewable model generator 160 may receive the one or more images 116 captured by the AR application 105. In certain embodiments, the viewable model generator 160 is implemented in software and executed as part of the AR application 105. Thus, the viewable model generator 160 can be located on the same computing device that captures the images 116. Alternatively, viewable model generator 160 can be executed on a separate computing device.

The viewable model generator 160 may be configured to generate the viewable model 118 based on the images 116. The viewable model 118 may be saved as a single file or multiple files, for example, in a memory of the computing device on which the viewable model generator 160 is executed. The viewable model 118 may be displayed as an animation. For example the viewable model 118 may be displayed as a spin image that an end-user may interact with by, for example, manually cycling through a sequence of images in which a virtual object is shown rotating. The displayed images correspond to the images 116, but are not necessarily identical. For example, the viewable model generator 160 may subject the images 116 to one or more image processing operations (e.g., cropping, filtering, adding visual effects, etc.) to produce the images that are ultimately incorporated into the viewable model 118.

The viewable model 118 may specify a sequence of images. For example, the sequence may include a first image that corresponds to an initial view or state of a virtual object. From this first image, an end-user may progress through the sequence in one or more orders, e.g., in an order corresponding to a clockwise rotation or an order corresponding to a counterclockwise rotation.

The viewable model 118 may be integrated into any number of viewing platforms. For example, as depicted in FIG. 1, the viewable model 118 can be placed into one or more websites 170 and 172. As another example, the viewable model 118 can be integrated into a software application 174. For instance, the viewable model 118 could be provided as a library file that is compiled along with source code for the application 174.

In some embodiments, the AR application 105 may be configured to automatically capture images for generating viewable models based on different AR models, but using the same view 104 of the physical environment. For example, the AR application 105 can be pre-loaded with multiple AR models, each AR model corresponding to a different object or different configurations of the same object. The AR application 105 may capture a separate set of images 116 for each AR model by generating an AR scene in which a corresponding virtual object augments the view 104. Such processing would permit multiple viewable models 118 to be generated using the same physical environment 102 while minimizing the amount of manual configuration or setup involved in capturing images for the viewable models.

In one scenario, the AR application 105 may be configured to download or access a static (non-configurable) AR model from a server and then apply the AR model to generate an AR scene. For instance, the AR application 105 may be configured to automatically determine a location within the AR scene to place the virtual object (e.g., determine a virtual surface), automatically resize and position the virtual object (e.g., so that the virtual object fits within a display screen on which the user interface 200 in FIG. 2 is presented), and automatically capture all the images needed for generating a viewable model. The AR application 105 may repeat such processing for hundreds or thousands of AR models. Using the AR application 105 or a separate application executing in conjunction with the AR application 105, the user may specify which AR models to process in addition to specifying a shared configuration (e.g., shared image parameters) for the viewable models that are to be generated using the specified AR models.

In another scenario, at least some of the AR models downloaded or accessed by the AR application 105 may be configurable. The AR application 105 or a separate application executing in conjunction with the AR application 105 could automatically configure an AR model by assigning values to various parameters or attributes indicated in the AR model. Once the configuration is complete, the AR application 105 could generate an AR scene based on the configured values, capture images of a virtual object in the AR scene, and then locally save or transmit the captured images to a remote server for use in generating a viewable model. This processing could be repeated to automatically reconfigure the same AR model according to a different set of values and generate another viewable model, e.g., a viewable model showing the same object in a different configuration such as a different color, different accessories, and so on.

FIG. 1 is merely an example. In other embodiments, one or more components depicted in FIG. 1 may be remotely located or certain components combined. For example, as indicated above, the viewable model generator 160 and the AR application 105 may be implemented on different computing devices. In some embodiments, AR models may be loaded into the AR application 105 from a remote server, and the images 116 are transmitted to the remote server or a different server for use in generating viewable models. Thus, the components of the system 100 are not necessarily restricted to operating on a single device. Additionally, in some embodiments, at least some of the viewable model related functionality described above is implemented via a cloud service. For instance, the images 116 may initially be stored on a memory of the computing device that executes the AR application 105 and then moved for storage on a cloud server. Further, the generation of the viewable model 118 could be performed remotely, by the cloud server or another computer on the cloud, and using the images stored on the cloud server. As another example, a cloud-based store could host applications (e.g., the application 174) configured to present viewable models. The hosted applications could be delivered via the cloud for local execution on an end-user device or executed on the cloud itself to remotely control the display of a viewable model on the end-user device.

In some embodiments, the system 100 may include one or more additional sensors besides the camera 110. For example, the camera 110 may be co-located with a LIDAR (light detection and ranging) sensor or a radar sensor on the same computing device. Using a LIDAR or radar sensor would enable a 3D view of the physical environment 102 to be captured and combined with the view 104 to generate a more detailed view for use in generating the AR scene 112. For instance, the 3D view from the LIDAR/radar sensor may indicate the exact depth of different points in the physical environment 102. Such depth information could be taken into consideration when generating the AR scene 112 by, for example, positioning the virtual object so that it appears in front of or behind a physical object. In this manner, the three-dimensional coordinates of each point in the AR scene 112, including coordinates corresponding to the virtual object, could be determined precisely. Thus, if the virtual object was a chair, then a person in the physical environment 102 could be shown walking between the virtual chair and the camera 110. This would permit more detailed interactions between the virtual object and the physical environment to be depicted within the AR scene. For example, the virtual object could be shown scooping up a pile of virtual dirt in front of the virtual object and then placing the virtual dirt in a physical bin located behind the virtual object. In contrast, in conventional augmented reality techniques the virtual object is always overlaid on top of the view of the physical environment so that anything that the virtual object is overlaid on is no longer visible, since the virtual object would be "in front of" everything else in the AR scene.

The embodiments described herein provide numerous advantages over conventional methods of generating viewable models. For instance, to generate a spin image using a conventional turntable setup, a physical object is placed on a turntable and rotated through a desired range of motion in synchronization with image capture, e.g., a single photo every few degrees. Turntables obstruct the view of the physical object and need to be removed through post-capture image processing. The removal of the turntable is a time consuming and labor-intensive process. Additionally, turntables are particularly problematic when images below the plane of the turntable are desired (e.g., the underside of a vehicle). To capture these additional views, the physical object is repositioned in a different orientation and then another set of images is captured. This additional set of images needs to be synchronized with the earlier captured images.

Another disadvantage of turntables is that the physical object has a fixed configuration. In practice, products often come in a variety of configurations (colors, materials, accessories, size, and the like). The provider of the physical object for the photoshoot (e.g., the manufacturer or seller) usually does not have simultaneous access to all the configurations of the physical object. Even if the provider does have access, it is nonetheless time consuming to set up each configuration on the turntable and capture photos for all configurations.

Additionally, no turntable is suitable for every type of physical object. For instance, the size of a physical object may necessitate a very small or very large turntable. A turntable sized for one object (e.g., a suitcase sized item) may not be suitable for a smaller object (e.g., a diamond) because the large turntable may prevent the photographer from getting close enough to the object to capture a high-quality photo. Conversely, it is impractical to put a much larger object (e.g., a locomotive) on a turntable sized for a much smaller object (e.g., motor vehicle).

Yet another disadvantage of using turntables is that the physical environment is restricted. The resulting spin image will show the physical object as it appears under the environment and lighting of the photography studio, but not as the physical object would appear in another setting (e.g., outdoors and under certain weather conditions).

The embodiments described herein also provide advantages over computer-generated imagery (CGI), more specifically, 3D computer graphics. In CGI, a 3D computer model simulates a physical object based on colors, textures, materials, shading, sky maps, and material properties. However, the resulting images may not be photorealistic because the 3D model does not in itself supply the rich environment and lighting needed to make the object look real. To solve this problem, ray-tracing is often employed to "finish" the 3D model to make it appear as a real object. If ray-tracing is done correctly, it is difficult to distinguish the 3D model from the real object. However, ray-tracing is extremely computation intensive. On a computer with a modern graphics processing unit (GPU), generating a 360-degree spin image typically takes 8-12 hours. Advanced GPU technology may reduce processing time to a certain extent, but is cost-prohibitive. In contrast to CGI, the images 116 may be captured in a relatively small amount of time (e.g., minutes instead of hours or days). A typical processing time for capturing images using the AR techniques described herein is approximately one second to capture each image, so a 10-degree rotational step would take 36 seconds for a total of 36 images, and a 5-degree step would take 72 seconds for 72 images. Actual processing times may vary and may be even shorter.

Compared to turntable setups, CGI is less restricted in terms of environment. For instance, to make the 3D model reflect an image of a particular environment, a skybox may be generated and the 3D model placed within the skybox so that images corresponding to the sides of the skybox are reflected off the surface of the 3D model using ray-tracing. However, if a different environment is desired, a new skybox would need to be created.

Unlike turntables or CGI, the augmented reality techniques described herein enable virtual objects to be placed into any physical environment. Because a virtual object may interact with elements of a physical environment, the resulting images of the virtual object will look photorealistic. For example, if the sun is shining into a physical room, the virtual object will show the brightness and will reflect the colors and textures of the room, and as the lighting changes (e.g., sunset, clouds passing by), the virtual object will take on the new environmental conditions. This contributes to the realism of the virtual object. Additionally, virtual objects may be manipulated (e.g., moved or resized) in ways that are difficult to do for a physical object.

Figure 5:
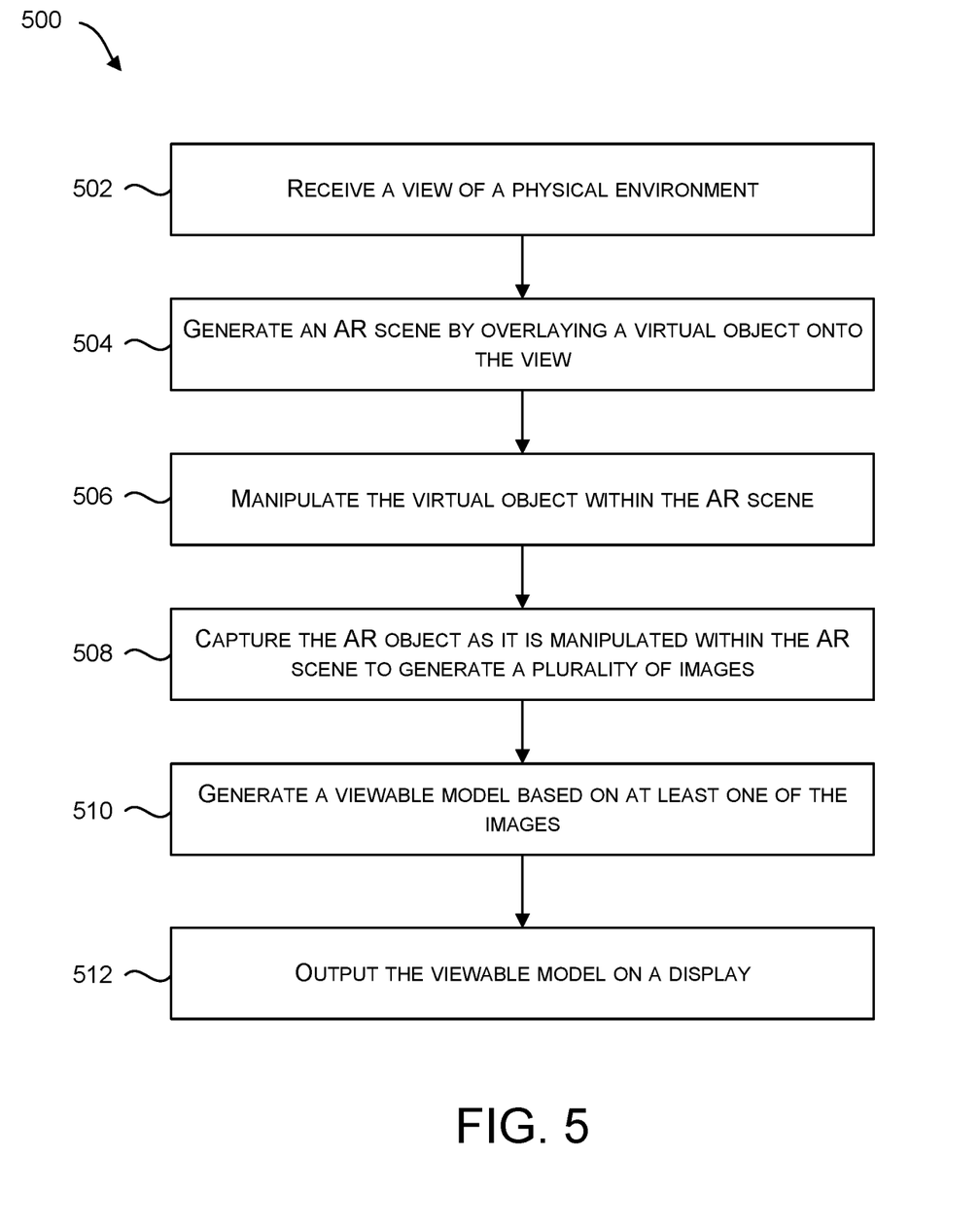
FIG. 5 is a flow chart that illustrates an example of a process for generating a viewable model, according to certain embodiments.

FIG. 5 illustrates a flow chart of a process 500 for generating a viewable model, according to some embodiments. Although FIG. 5 depicts operations being performed in a particular order, alternative embodiments may involve similar operations being performed in a different order, additional operations, fewer operations, or different operations than those illustrated. In certain embodiments, the process 500 is performed by one or more computer systems that implement the system 100 in FIG. 1.

At 502, a view of a physical environment may be received. The view may, for example, be a live video stream captured by and/or transmitted from a camera located in or around the physical environment. The physical environment may include light sources, physical objects, and/or other physical features. The camera may be part of a handheld or mobile device, such as a smart phone, a tablet computer, a laptop computer, a video camera, and/or any other digital device equipped with a camera.

At 504, an AR scene may be generated by overlaying a virtual object onto the view. The virtual object may be generated based on information in an AR model (e.g., AR model 106). The information in the AR model may include information on one or more attributes of the virtual object. These attributes may include, for example, reflectivity, opacity, texture, color, or other properties of the virtual object. The AR model may include any virtual 3D representation of a physical object, and may include wireframes, vertices, services, and/or other constructs used to generate virtual objects. The AR model may be based on actual physical object. For example, an AR model may be generated for a product or object to be displayed on the website using a spin image. The AR model may have dimensions, colors, sizes, and other physical attributes that are based on the physical object. The AR model may be sized such that it is proportional with the physical environment.

As part of generating the AR scene, one or more interactions between the virtual object and the physical environment, or between the virtual object and another virtual object, may be determined. For example, an AR application performing the process 500 may determine that there is an interaction between one or more attributes of the virtual object (e.g., reflectivity, color, opacity, etc.) and one or more attributes of the physical environment (e.g., colors, shadows, lighting conditions, etc.). The AR scene may be updated, e.g., in real-time, to indicate these interactions. For example, with each rotation of the virtual object, reflections, shadows, occlusions, and other interactions with physical objects or the physical environment may be updated in real time and displayed as part of the virtual object.

At 506, the virtual object may be manipulated (automatically or manually) within the AR scene. For example, the virtual object may be rotated about one or more axes, or part of the virtual object may be moved from one location in the AR scene to another location in the AR scene. As the virtual object is manipulated, the appearance of the virtual object may be updated based on how the material properties of the virtual object interacts with the physical environment. For example, the virtual object may include surfaces that vary in reflectivity such that when the virtual object is in one position, less of the physical environment is reflected compared to when the virtual object is in a different position. Thus, the appearance of the virtual object may change as the virtual object is being manipulated, not only because of a shift in the visible portion of the virtual object (from the perspective of the camera supplying the view of the physical environment), but also because of the influence of the physical environment. The virtual object may be manipulated by rotating the virtual object incrementally around an axis of rotation. A script may be used to control different object manipulations between captured images. For example, a script may rotate the virtual object around a center vertical axis 5° and capture an image. The script may then rotate one increment around the horizontal axis and again make a complete rotation around the vertical access, capturing images at each increment. Other scripts may generate animated sequences of movements involving different parts of the virtual object. For example, some scripts may open/close portions of the virtual object, assemble or disassemble portions of the virtual object or generate exploded views, change in physical configuration of the virtual object (e.g., open or close a folding chair), and so forth.

The processing in 506 is optional, as the virtual object does not need to be manipulated in order to capture one or more images that show the virtual object interacting with the physical environment or other virtual objects in the AR scene. Further, as discussed above, manipulating a virtual object may involve changes beyond simply moving all or part of the virtual object. For instance, the manipulation performed in 506 may involve changing the color of the virtual object or some other manipulation that causes the state of the virtual object to change within the AR scene.

At 508, the virtual object may be captured as it is being manipulated within the AR scene. The virtual object may be captured in a set of images that show the virtual object changing in response to the manipulation. Alternatively, the virtual object may be captured staying still. The capturing in 508 may be performed in an automated fashion, for example, by automatically rotating the virtual object to capture images of the virtual object in specific angular positions or increments.

At 510, a viewable model may be generated based on at least one of the images captured in 508. For example, the viewable model may include the captured images (or images derived therefrom) arranged in a sequence.

At 512, the viewable model may be output on a display. As discussed above, viewable models may be integrated into any number of viewing platforms for viewing by an end-user. For example, the outputting of the viewable model in 512 may involve presenting a still image, or a spin image or other interactive presentation within a web browser or a user interface provided by a software application. The viewable model may include a plurality of images captured at increments of rotation to generate a 360° view of the virtual object known as a spin image.

Figure 6:
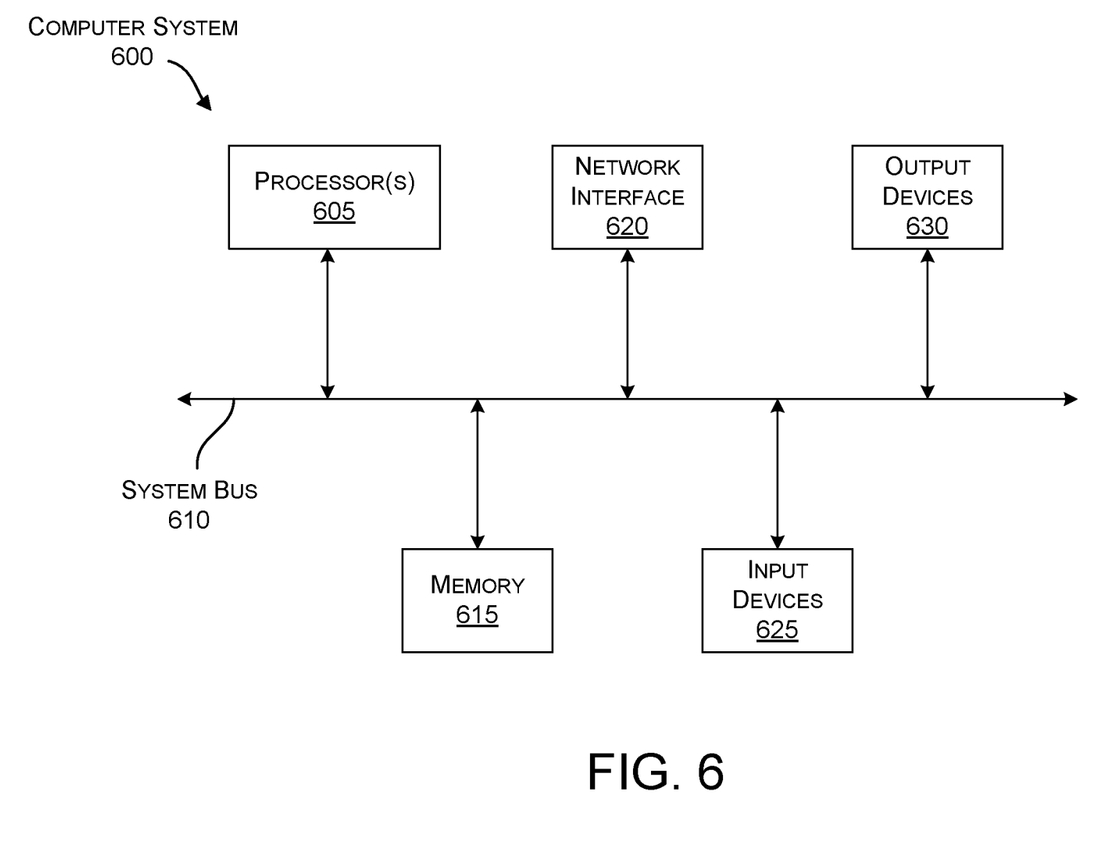
FIG. 6 illustrates an example of a computer system in which various aspects of the disclosure may be implemented.

FIG. 6 illustrates an example of a computer system 600 in which various aspects of the disclosure may be implemented. Various components illustrated in the previously described figures, such as AR application 105 and the viewable model generator 160, may be implemented using one or more instances of the computer system 600 depicted in FIG. 6.

As shown in FIG. 6, the computer system 600 may include one or more processors 605 (e.g., a general-purpose processor in combination with a graphics processing unit), which may be interconnected to other components of the computer system 600 via a system bus 610. This interconnection may enable processors 605 to execute instructions stored in memory 615, for example, and control other components of the computer system 600, such as a network interface 620, one or more input devices 625, and one or more output devices 630. Network interface 620 may facilitate communication with other computer systems, and may include wired network interfaces, such as an Ethernet interface, and/or wireless network interfaces, such as an IEEE 802.11 interface. Input devices 625 may include peripheral devices, such as one or more keyboards, mice, microphones and/or the like, and output devices 630 may include various output subsystems, such as one or more displays, speakers, and/or the like. Other components may be similarly coupled to and/or otherwise implemented in computer system 600.

Although the present disclosure has been described with respect to specific embodiments, it will be appreciated that the disclosure is intended to cover all modifications and equivalents within the scope of the following claims. Any and/or all of the techniques, methods, and/or method steps discussed above may be implemented in software (e.g., programs, code, instructions, etc.), hardware, or combinations thereof. The software may be stored on a non-transitory storage medium (e.g., the memory discussed above), and, when executed by one or more processors of a computer system, may cause the one or more processors to perform one or more of the techniques, methods, and/or method steps. Additionally or alternatively, in some embodiments, any and/or all of the software may leverage a Software as a Service (SaaS) model, in which one or more methods and/or method steps are executed and/or otherwise performed in the cloud (e.g., at a web server) in order to provide various functionality to a remote end-user (e.g., at the end-user's web browser).

What is claimed is:

1. A method comprising:
    receiving, by a computer system, a view of a physical environment, wherein the view is captured using a camera located in the physical environment;
    generating, by the computer system, an augmented reality (AR) scene, the generating of the AR scene comprising overlaying a virtual object onto the view of the physical environment;
    generating and storing, by the computer system, a plurality of images using the AR scene including the virtual object, wherein generating the plurality of images comprises:
        manipulating the virtual object within the AR scene, and
        capturing the virtual object being manipulated within the AR scene at a plurality of different perspectives;
    generating, by the computer system, a viewable model of the virtual object based on the plurality of images showing the virtual object in the physical environment, wherein the viewable model comprises a sequence of the plurality of images that can later be interactively viewed by a user to show the virtual object being manipulated as it would be viewed in the physical environment; and
    outputting, by the computer system, the viewable model on a display.

2. The method of claim 1, further comprising:
    determining, by the computer system, an interaction between the virtual object and the physical environment; and
    updating the AR scene to indicate the interaction.

3. The method of claim 2, wherein updating the AR scene comprises:
    generating a reflection of the physical environment on a surface of the virtual object that changes between at least two of the plurality of images.

4. The method of claim 3, wherein the reflection is generated based on a material property of the virtual object.

5. The method of claim 1, further comprising:
    resizing, by the computer system, the virtual object prior to capturing the virtual object.

6. The method of claim 1, wherein capturing the virtual object being manipulated within the AR scene comprises:
    receiving, by the computer system, user input indicating a total number of images for the plurality of images or indicating an angular increment for rotating the virtual object;
    determining a set of angular positions based on the user input; and
    capturing the virtual object at each angular position in the set of angular positions.

7. The method of claim 1, wherein capturing the virtual object being manipulated within the AR scene comprises:
    capturing a set of images depicting the virtual object in different positions; and
    selecting a subset of the captured images for inclusion in the plurality of images.

8. The method of claim 1, wherein manipulating the virtual object within the AR scene comprises:
    rotating the virtual object around multiple axes of rotation.

9. The method of claim 1, wherein manipulating the virtual object within the AR scene comprises:
    moving at least part of the virtual object from one location in the AR scene to another location in the AR scene.

10. The method of claim 1, wherein generating the viewable model comprises:
    removing, by the computer system, the physical environment from the plurality of images.

11. A non-transitory computer-readable memory storing a plurality of instructions that, when executed by one or more processors, cause the one or more processors to perform operations comprising:
    receiving, by a computer system, a view of a physical environment, wherein the view is captured using a camera located in the physical environment;
    generating, by the computer system, an augmented reality (AR) scene, the generating of the AR scene comprising overlaying a virtual object onto the view of the physical environment;
    generating and storing, by the computer system, a plurality of images using the AR scene including the virtual object, wherein generating the plurality of images comprises:
        manipulating the virtual object within the AR scene, and
        capturing the virtual object being manipulated within the AR scene at a plurality of different perspectives;
    generating, by the computer system, a viewable model of the virtual object based on the plurality of images showing the virtual object in the physical environment, wherein the viewable model comprises a sequence of the plurality of images that can later be interactively viewed by a user to show the virtual object being manipulated as it would be viewed in the physical environment; and
    outputting, by the computer system, the viewable model on a display.

12. The non-transitory computer-readable memory of claim 11, wherein the virtual object comprises a hotspot location that is rendered and displayed in the AR scene.

13. The non-transitory computer-readable memory of claim 12, wherein the plurality of images comprises rendered 2D images of the hotspot.

14. The non-transitory computer-readable memory of claim 13, wherein locations of the rendered 2D images of the hotspots are identified in the plurality of images and associated with one or more actions to be executed when the locations of the rendered 2D images of the hotspots are selected in the viewable model.

15. The non-transitory computer-readable memory of claim 14, wherein the one or more actions comprises generating a pop-up window displaying additional information associated with the hotspot.

16. The non-transitory computer-readable memory of claim 14, wherein the one or more actions comprises generating a control that alters an appearance of the virtual object.

17. The non-transitory computer-readable memory of claim 11, wherein the viewable model comprises a spin image that rotates a view of the virtual object, wherein each angle of rotation is associated with an image in the plurality of images.

18. The non-transitory computer-readable memory of claim 11, wherein the operations further comprise:
  causing a real-time view of the AR scene to be displayed on a handheld computing device, wherein the handheld computing device comprises a display screen and the camera, and wherein the display screen is different from the display on which the viewable model is displayed.

19. The non-transitory computer-readable memory of claim 11, wherein the operations further comprise:
  accessing a plurality of configurations for the virtual object; and
  generating viewable models for each of the plurality of configurations.

20. A system comprising:
  one or more processors; and
  memory coupled to the one or more processors, the memory storing a plurality of instructions that, when executed by the one or more processors, cause the one or more processors to perform processing comprising:
    receiving, by a computer system, a view of a physical environment, wherein the view is captured using a camera located in the physical environment;
    generating, by the computer system, an augmented reality (AR) scene, the generating of the AR scene comprising overlaying a virtual object onto the view of the physical environment;
    generating and storing, by the computer system, a plurality of images using the AR scene including the virtual object, wherein generating the plurality of images comprises:
      manipulating the virtual object within the AR scene, and
      capturing the virtual object being manipulated within the AR scene at a plurality of different perspectives;
    generating, by the computer system, a viewable model of the virtual object based on the plurality of images showing the virtual object in the physical environment, wherein the viewable model comprises a sequence of the plurality of images that can later be interactively viewed by a user to show the virtual object being manipulated as it would be viewed in the physical environment; and
    outputting, by the computer system, the viewable model on a display.

* * * * *